Patented Nov. 1, 1938

2,134,706

UNITED STATES PATENT OFFICE 2,134,706

PROCESS OF FLOTATION AND AGENT THEREFOR

Ira H. Derby and Orin D. Cunningham, Indianapolis, Ind., assignors to Peter C. Reilly, Indianapolis, Ind.

No Drawing. Application February 24, 1931, Serial No. 518,019

22 Claims. (Cl. 209—166)

The present invention relates to improvements in ore flotation, including the flotation of sulfide ores, and other metalliferous material, by the use of "nuclear phosphorus compounds" containing sulfur, that is, compounds structurally consisting of atoms and groups of atoms (or radicals) united to one or more phosphorus atoms as a nucleus, which compounds also contain sulfur. The invention is based upon our observation that certain compounds as described herein, which structurally consist of phosphorus as a nucleus to which the other atoms or groups of atoms (radicals) are attached, and which contain sulfur, are excellent flotation agents and constitute a class of compounds that have not heretofore been used in the art of flotation. The invention embraces both the products and the method of making the same, and their employment in flotation.

More particularly our present invention embraces ore flotation while using reagents containing products of reaction of phosphorus sulfides (such as the trisulfide $P_2S_3$ or pentasulfide $P_2S_5$), with certain compounds which may be organic or organic-inorganic.

We give the following classifications of some of the compounds which undergo reactions that yield "nuclear phosphorus compounds" which can conveniently be employed in ore flotation in accordance with the present invention, namely, the reaction of a phosphorus sulfide such as phosphorus pentasulfide, $P_2S_5$, with (a) phenolic compounds, such as carbolic acid or its homologues; or the alkali metal salts of phenols such as potassium phenolate or sodium cresylate or the like; (b) the alcohols, such as methyl or ethyl alcohol; or the alkali metal salts of alcohols such as sodium ethylate; (c) the aliphatic mercaptols, for example, ethyl mercaptol; or the alkali metal salts of mercaptol, such as the sodium or potassium salts of ethyl mercaptol; (d) the aromatic mercaptols, and their alkali metal salts, for example phenyl mercaptol; (e) aliphatic and aromatic nitrogenous bases, including such substances as ethylamine, aniline or its homologues; and (f) the nitriles, for example benzonitrile.

In the present case we are claiming particularly reaction products made by the use of said class e, nitrogenous bases. The nitriles (covered specifically in our Patent No. 1,813,346), are cyanides, and are hence not nitrogenous bases. Thus benzonitrile is phenyl cyanide $C_6H_5CN$.

The reactions of the phosphorus sulfides, for example phosphorus pentasulfide, $P_2S_5$, with the organic-inorganic and organic compounds classified above, may result in the formation of a single chemical substance with two or more phosphorus atoms as a nucleus of the molecular structure, or there may be a splitting of the molecule of the phosphorus sulfide compound to yield two or more products each containing one or more nuclear phosphorus atoms, or the reaction may or may not involve the elimination of some of the sulfur of the phosphorus sulfide by the substitution of some other atoms or groups of atoms (radicals), the resulting product or products being characterized, however, by the presence of a nuclear phosphorus atom or atoms in the molecular structure and the presence of sulfur.

These substances have a very high selective action or collecting power for metalliferous materials, such as sulfide minerals, in mineral flotation operations but are lacking somewhat in frothing properties, so that any appropriate frothing agent (such, for example, as pine oil or tar acids), should be employed in conjunction therewith in carrying out the flotation operation. It is not necessary that chemically pure substances be used since the unrefined products can be employed, with metallurgical results equally good to those obtained with pure substances.

The phosphosulfo compounds above referred to can be used either alone or mixed with other oily materials having flotation value, or with solvent agents or mixtures of the same.

Generally stated, it is sufficient to select the desired organic or organic-inorganic compound from the classification given above, and to react thereupon with phosphorus pentasulfide or other sulfide of phosphorus, or even with a mixture of phosphorus and sulfur, the reaction being performed in a suitable container, and at a temperature sufficiently high to cause reaction to take place. In many cases it has been found advisable to employ a mixture of such compounds, some of which apparently function as solvents, and may also function as both solvents and reacting materials.

For the preparation of the phosphosulfo compounds referred to we give the following specific examples:

(1) One part of powdered phosphorus pentasulfide $P_2S_5$, is slowly mixed with 2 to 3 parts of tar acids and the mixture is then heated to 100° C. or thereabout, with constant stirring, and maintained at this temperature until the $P_2S_5$ has reacted with the tar acids to such an extent that it passes into solution. The product is a transparent syrupy liquid. The amount of tar acids used may be varied arbitrarily so long as there is sufficient tar acid present to react with the $P_2S_5$ and leave the reaction product in a liquid condition. If tar acid is used as the frothing agent in the flotation operation, the $P_2S_5$ may be combined with the tar acids in such a proportion as to form a reagent combining both frothing and collecting properties.

(2) One part of powdered phosphorus pentasulfide $P_2S_5$, is mixed with 3 to 4 parts of ethyl alcohol and the mixture is then heated to 70° C., or thereabout, with constant stirring, and maintained at this temperature until the P₂S₅ has reacted with the alcohol to the extent that it disappears in solution. The product is a clear liquid.

The proportion of tar acids and alcohol in the above examples corresponds to an excess over that required for the reaction with phosphorus pentasulfide, the excess alcohol and tar acids acting as a solvent or reaction medium which may be recovered, by vacuum distillation, preferably, since continued heating at elevated temperature carries the reaction too far.

Instead of the procedure indicated above in Examples 1 and 2, the alcohol or tar acids may be brought up to the reaction temperature indicated and the phosphorus pentasulfide added slowly until the above proportion is obtained or until no further reaction takes place.

(3) The reaction of sodium alcoholate, for example, with phosphorus pentasulfide, P₂S₅, is preferably carried out in some organic solvent such as alcohol which later may be recovered by distillation. A suitable amount, say one part, of anhydrous sodium alcoholate is dissolved in about 5 parts of anhydrous ethyl alcohol to which is then slowly added with stirring 3.5 parts of P₂S₅, the temperature of the reaction mixture being maintained at 50° C., or thereabout until all of the P₂S₅ has entered into reaction.

Compounds of the type of sodium phenolate also react with phosphorus pentasulfide similarly to sodium alcoholate.

(4) One part of powdered phosphorus pentasulfide, P₂S₅, is slowly added to 3 to 4 parts of aniline in the cold and the temperature of the aniline not allowed to rise above 50° C., or thereabout, from the heat of the reaction. The reaction product is thrown out as a white solid, forming a paste with the excess aniline. The reaction of aniline with phosphorus pentasulfide under the above conditions occurs without the evolution of hydrogen sulfide as a by-product of reaction, whereas, by carrying out this reaction at 100° C., other conditions and reacting proportions remaining the same, the reaction proceeds with the evolution of one molecule of hydrogen sulfide per molecule of phosphorus pentasulfide; either of these reactions yielding a product possessing good flotation properties. Aniline, C₆H₅NH₂, is of course "an aromatic amine" and contains no oxygen. It hence can be termed "an oxygen-free aromatic amino compound". (The homologues of aniline, mentioned above, can also be so denominated.)

It should be noted that the reaction products of P₂S₅ with aliphatic or aromatic bases including such substances as ethylamine, aniline or its homologues, may be described as organic base salts of an organic thiophosphoric acid. The compound formed may be illustrated by the following empirical formula

where RNH₂ stands for an organic base and H and X attached thereto stand respectively for the positive (hydrogen) and negative group of the organic thiophosphoric acid compound and R stands for an organic radical. In this example, the organic base may be treated in alcoholic solution. Depending upon conditions such as temperature, proportions, etc. the alcohol may, to a greater or less extent, enter into the reaction. Or, instead of alcohol, we may use, as solvents for the nitrogenous base, the liquid substances included in the classification (a to f) given above. These also may, partially or completely, react with the phosphorus sulphide, during the process.

(5) One part of powdered phosphorus pentasulfide and about three parts of benzyl mercaptan are mixed together and heated at 115–125° C., or thereabout, with constant stirring, until the reaction is complete as evidenced by the disappearance of the solid phosphorus pentasulfide, or by the evolution of an amount of hydrogen sulfide equivalent to one molecule per molecule of phosphorus pentasulfide used. The reaction product is a clear syrupy liquid.

Other mercaptans may be reacted with phosphorus pentasulfide in a similar manner, for example about three parts of n-amyl mercaptan and one part of phosphorus pentasulfide at 115° C., or thereabout, readily combined to form a syrupy liquid product, hydrogen sulfide being a by-product of the reaction.

The alkali mercaptans, like the alkali alcoholates, combine with phosphorus pentasulfide. The reaction can conveniently be carried out in ethyl alcohol as a reaction medium.

It is known that mercaptans of themselves are flotation reagents, but by their chemical combination with phosphorus pentasulfide their flotation activity is increased.

In the examples given above, pure chemicals were used, but crude chemicals may be used with equally good resiults, except that it is preferable to use anhydrous materials for the reactions of phosphorus pentasulfide with organic or organic-inorganic substances.

In the examples herein given, we do not limit our claims to the quantities of reacting substances herein named.

The general procedure indicated in the above examples may be applied in chemically combining phosphorus pentasulfide with any of the compounds included in the classification outlined in the early part of this specification.

In some instances heat may have to be applied to bring about the desired chemical combination, (as for illustration Example No. 1) and in other cases the reaction mixture may desirably be cooled to carry on the reaction in the cold.

Phosphorus trisulfide may be used instead of the pentasulfide in the examples given, this being employed in an equimolecular proportion under very much the same reaction conditions.

It is preferable not to separate the reaction products in the above examples from the solvents but to use the products in their initial or unrefined condition. In most cases they are sufficiently soluble in water so that in the flotation operation they are quickly dispersed as an aqueous solution throughout the pulp.

The products obtained by the reaction of certain organic and organic-inorganic substances with phosphorus pentasulfide, as illustrated in the above examples, were employed in the flotation of a copper sulfide ore slime of the Utah Copper Company containing some copper oxides and analyzing about 0.9% copper, in the ratio of one tenth pound of product per ton of dry ore, and tar acids as a frothing agent and a lime circuit being employed in conjunction therewith. The ore was subjected to the ordinary flotation operation in a mechanical agitation type of flotation machine and a tailing analyzing about 0.06% copper was obtained, together with a high grade concentrate analyzing about 20% copper, corresponding to a recovery of about 95% of the copper value in the ore under treatment.

In other examples we have used both smaller and larger amounts of phosphosulfo compounds, in the flotation of ores, with satisfactory results, and we have also used phosphosulfo compounds both alone and with other flotation agents, with very satisfactory results. Furthermore, we do not limit our conditions for carrying out a flotation operation to those included in the above examples, but may use any type of flotation machine, as for example, the Callow cell, or instead of an alkaline circuit, we may use a normal or acid circuit.

In the above specification we have referred to the use of alcohol, such as ethyl alcohol. It is to be understood that other alcohols or mixtures thereof, such as denatured alcohol, methyl, propyl alcohol and higher alcohols can be likewise employed.

In the above specification we have referred to the use of alcoholates. We may use the alcoholates produced from methyl alcohol, ethyl alcohol, propyl alcohol or some higher alcohols, or mixtures thereof, such as denatured alcohols. The alcoholates containing more than five carbon atoms are not as suitable.

In several of the above examples we have referred to alkali metal salts, as constituting the flotation agent or substances used in the preparation thereof. We desire it understood that while we have secured satisfactory results with the alkali metal salts of sodium and potassium, other salts such as the ammonium salts and the alkaline earth metal salts of calcium can also be employed so far as these are soluble in oil or water or emulsions thereof. The procedure for making the alkaline earth metal salts, etc., will be obvious from the above disclosure.

In the present case we have described the use of phenolates, alcoholates, mercaptolic substances, organic nitrogenous bases and nitriles, as substances to react with phosphorus sulphides to form a flotation reagent. We have given several examples of such phenolates, etc., which are operative for the purpose, and we believe that certain closely related phenolates, etc., can be used, though there are others that will not serve. The expressions "phenolates", etc., as used in this case are accordingly to be construed as covering the examples given herein and products so closely related thereto as to function in a like manner.

The present case is a continuation in part of out copending application Ser. No. 96,061, filed March 19, 1926, issued June 30, 1931 as Patent No. 1,812,839, reissued June 5, 1934 as No. 19,192.

We claim:

1. The process of concentrating ores by froth flotation which comprises subjecting the ore in the form of a pulp to a flotation operation in the presence of a reaction product of an alcoholic solution of an amino compound and phosphorus pentasulfid.

2. An agent for use in flotation comprising a reaction product of an alcoholic solution of an amino compound and phosphorus pentasulfid.

3. An agent for use in flotation, comprising the reaction product of an alcohol, an aromatic amino compound and phosphorus pentasulfid.

4. An agent for use in flotation, comprising the reaction product of an alcohol, an aromatic amino compound, sulfur and phosphorus.

5. The process of concentrating ores by froth flotation which comprises subjecting the ore in the form of a pulp to a flotation operation in the presence of the reaction product of an alcohol, an amino compound and phosphorus pentasulfid.

6. The process of concentrating ores by froth flotation which comprises subjecting the ore in the form of a pulp to a flotation operation in the presence of the reaction product of an alcohol, an aromatic amino compound and phosphorus pentasulfid.

7. The process of concentrating ores by froth flotation which comprises subjecting the ore in the form of a pulp to a flotation operation in the presence of the reaction product of an oxygen free aromatic amino compound and phosphorus pentasulfid.

8. The process of concentrating ores by froth flotation which comprises subjecting the ore in the form of a pulp to a flotation operation in the presence of the reaction product of any oxygen free amino compound and phosphorus pentasulfid.

9. The process of concentrating ores by froth flotation which comprises subjecting the ore in the form of a pulp to a flotation operation in the presence of the reaction product of an oxygen free aromatic amino compound with sulfur and phosphorus.

10. An agent for use in flotation comprising the reaction product of an oxygen free aromatic amino compound with sulfur and phosphorus.

11. An agent for use in flotation comprising the reaction product of an oxygen free aromatic amino compound with phosphorus pentasulfid.

12. In the art of froth flotation the step of floating material to be concentrated in the presence of the herein described flotation agent which comprises a reaction product of a phosphorus sulfur compound with an organic nitrogenous base.

13. In the art of froth flotation the step of floating material to be concentrated in the presence of the herein described flotation agent which comprises a reaction product of a phosphorus sulfur compound with a substance selected from the herein described group consisting of (a) aliphatic amines, (b) aniline and its homologues.

14. A process which comprises froth flotation while in the presence of the herein described flotation reagent which is a reaction product of a phosphorus sulfur compound and aniline.

15. A process which comprises froth flotation while in the presence of the herein described flotation reagent which is a reaction product of a phosphorus sulfur compound and a substance selected from the herein described group consisting of aniline and a homologue of aniline.

16. A process which comprises froth flotation while in the presence of the herein described flotation reagent which is a reaction product of phosphorus pentasulfide and an aromatic amine.

17. A process which comprises froth flotation while in the presence of the herein described flotation reagent which is a reaction product of a phosphorus sulfur compound and ethyl amine.

18. A process which comprises froth flotation while in the presence of the herein described flotation reagent which is a reaction product of a phosphorus sulfur compound and an alkyl amine.

19. An agent for use in froth flotation of metalliferous materials comprising an aromatic amine salt of an organic thiophosphoric acid.

20. An agent for use in froth flotation of metalliferous materials comprising an amine salt of an organic thiophosphoric acid.

21. An agent for use in froth flotation of metalliferous materials comprising a reaction product of anilin with a phosphorus sulfid.

22. An agent for use in froth flotation of metalliferous materials comprising a thiophosphoric compound including an organic nitrogen base radical.

IRA H. DERBY.
ORIN D. CUNNINGHAM.